US011627502B2

(12) United States Patent
Zhu et al.

(10) Patent No.: US 11,627,502 B2
(45) Date of Patent: Apr. 11, 2023

(54) MEASUREMENTS FOR MULTICAST/BROADCAST SERVICE CONTINUITY

(71) Applicant: QUALCOMM Incorporated, San Diego, CA (US)

(72) Inventors: Xipeng Zhu, San Diego, CA (US); Gavin Bernard Horn, La Jolla, CA (US); Alberto Rico Alvarino, San Diego, CA (US); Prasad Reddy Kadiri, San Diego, CA (US); Xiaoxia Zhang, San Diego, CA (US); Le Liu, Fremont, CA (US); Kazuki Takeda, Tokyo (JP); Umesh Phuyal, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 232 days.

(21) Appl. No.: 16/949,336

(22) Filed: Oct. 26, 2020

(65) Prior Publication Data
US 2021/0185566 A1  Jun. 17, 2021

Related U.S. Application Data

(60) Provisional application No. 62/948,592, filed on Dec. 16, 2019.

(51) Int. Cl.
*H04W 36/00* (2009.01)
*H04W 24/10* (2009.01)
(Continued)

(52) U.S. Cl.
CPC ...... *H04W 36/0007* (2018.08); *H04B 17/318* (2015.01); *H04B 17/336* (2015.01);
(Continued)

(58) Field of Classification Search
None
See application file for complete search history.

(56) References Cited

U.S. PATENT DOCUMENTS

2012/0236776 A1* 9/2012 Zhang ............... H04W 36/0007
370/312
2016/0374050 A1* 12/2016 Prasad ................ H04L 12/1868

FOREIGN PATENT DOCUMENTS

EP  2683192 A1  1/2014
EP  3101861 A1  12/2016
(Continued)

OTHER PUBLICATIONS

International Search Report and Written Opinion—PCT/US2020/070703—ISA/EPO—dated Feb. 15, 2021.

*Primary Examiner* — Suhail Khan
(74) *Attorney, Agent, or Firm* — Harrity & Harrity, LLP

(57) ABSTRACT

Various aspects of the present disclosure generally relate to wireless communication. In some aspects, a user equipment (UE) may obtain a set of measurements related to a unicast service channel based at least in part on one or more reference signals associated with the unicast service channel and a set of measurements related to a multicast/broadcast service (MBS) channel based at least in part on one or more reference signals associated with the MBS channel. The UE may apply one or more communication parameters to ensure continuity for an MBS service. For example, in some aspects, the one or more communication parameters are based at least in part on the set of measurements related to the unicast service channel and the set of measurements related to the MBS channel. Numerous other aspects are provided.

30 Claims, 15 Drawing Sheets

(51) Int. Cl.
*H04L 5/00* (2006.01)
*H04B 17/336* (2015.01)
*H04W 36/08* (2009.01)
*H04B 17/318* (2015.01)

(52) U.S. Cl.
CPC ............ *H04L 5/005* (2013.01); *H04W 24/10* (2013.01); *H04W 36/00835* (2018.08); *H04W 36/00837* (2018.08); *H04W 36/08* (2013.01)

(56) References Cited

FOREIGN PATENT DOCUMENTS

| | | | |
|---|---|---|---|
| WO | 2015000912 | A1 | 1/2015 |
| WO | 2015103746 | A1 | 7/2015 |

\* cited by examiner

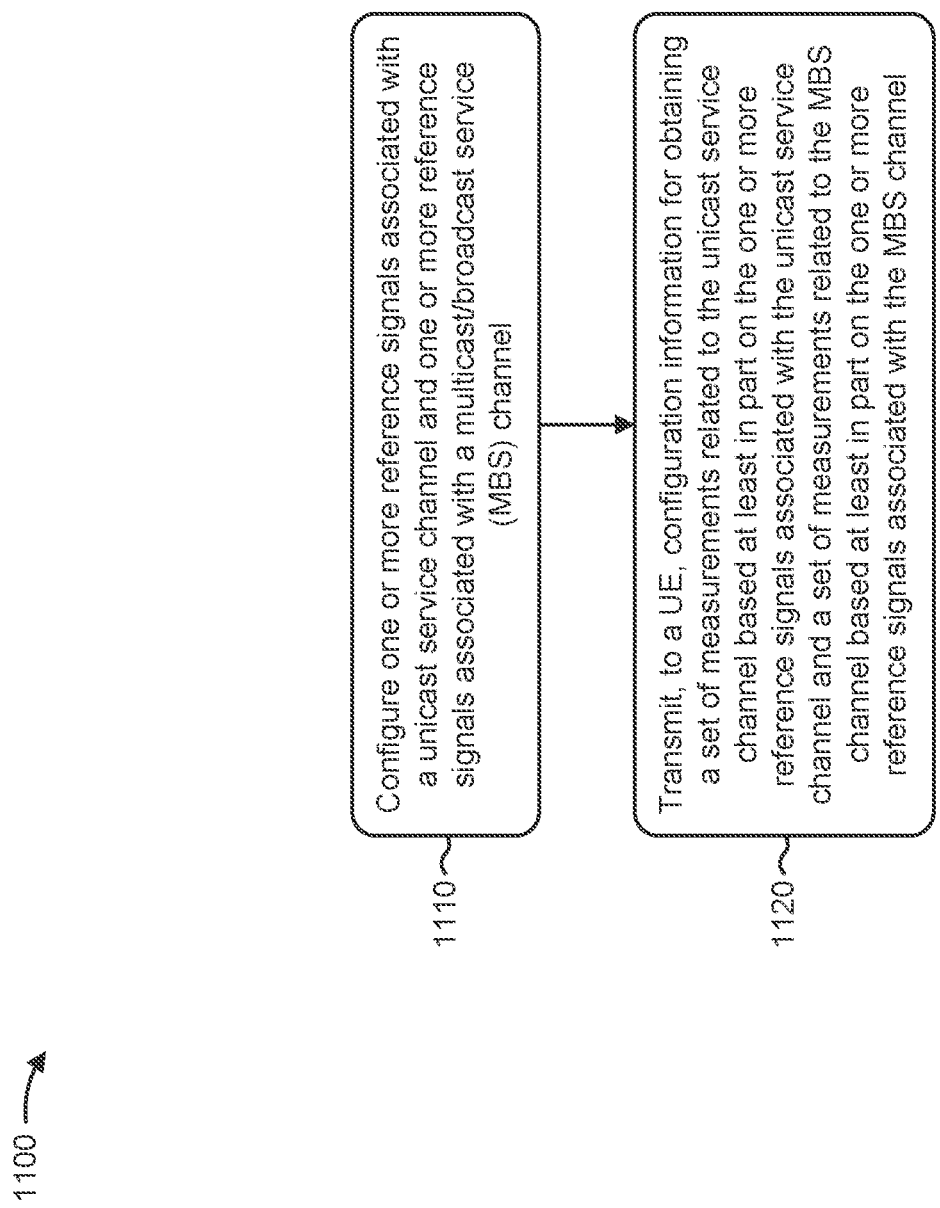

MEASUREMENTS FOR MULTICAST/BROADCAST SERVICE CONTINUITY

CROSS-REFERENCE TO RELATED APPLICATION

This Patent Application claims priority to U.S. Provisional Patent Application No. 62/948,592, filed on Dec. 16, 2019, entitled "MEASUREMENTS FOR MULTICAST/BROADCAST SERVICE CONTINUITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for measurements for multicast/broadcast service continuity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: obtaining a set of measurements related to a unicast service channel based at least in part on one or more reference signals associated with the unicast service channel and a set of measurements related to a multicast/broadcast service (MBS) channel based at least in part on one or more reference signals associated with the MBS channel; and applying one or more communication parameters to ensure continuity for an MBS service, wherein the one or more communication parameters are based at least in part on the set of measurements related to the unicast service channel and the set of measurements related to the MBS channel.

In some aspects, a UE for wireless communication may include a memory and one or more processors coupled with the memory. The memory and the one or more processors may be configured to: obtain a set of measurements related to a unicast service channel based at least in part on one or more reference signals associated with the unicast service channel and a set of measurements related to an MBS channel based at least in part on one or more reference signals associated with the MBS channel; and apply one or more communication parameters to ensure continuity for an MBS service, wherein the one or more communication parameters are based at least in part on the set of measurements related to the unicast service channel and the set of measurements related to the MBS channel.

In some aspects, a non-transitory computer-readable medium may store one or more instructions for wireless communication. The one or more instructions, when executed by one or more processors of a UE, may cause the one or more processors to: obtain a set of measurements related to a unicast service channel based at least in part on one or more reference signals associated with the unicast service channel and a set of measurements related to an MBS channel based at least in part on one or more reference signals associated with the MBS channel; and apply one or more communication parameters to ensure continuity for an MBS service, wherein the one or more communication parameters are based at least in part on the set of measurements related to the unicast service channel and the set of measurements related to the MBS channel.

In some aspects, an apparatus for wireless communication may include: means for obtaining a set of measurements related to a unicast service channel based at least in part on one or more reference signals associated with the unicast service channel and a set of measurements related to an MB S channel based at least in part on one or more reference signals associated with the MBS channel; and means for applying one or more communication parameters to ensure continuity for a MBS service, wherein the one or more communication parameters are based at least in part on the set of measurements related to the unicast service channel and the set of measurements related to the MB S channel.

In some aspects, a method of wireless communication, performed by a base station, may include: configuring one or more reference signals associated with a unicast service channel and one or more reference signals associated with an MBS channel; and transmitting, to a UE, configuration information for obtaining a set of measurements related to the unicast service channel based at least in part on the one or more reference signals associated with the unicast service channel and a set of measurements related to the MBS channel based at least in part on the one or more reference signals associated with the MBS channel.

In some aspects, a base station for wireless communication may include a memory and one or more processors coupled with the memory. The memory and the one or more processors may be configured to: configure one or more reference signals associated with a unicast service channel and one or more reference signals associated with an MBS channel; and transmit, to a UE, configuration information for obtaining a set of measurements related to the unicast service channel based at least in part on the one or more reference signals associated with the unicast service channel and a set of measurements related to the MBS channel based at least in part on the one or more reference signals associated with the MBS channel.

In some aspects, a non-transitory computer-readable medium may store one or more instructions for wireless communication. The one or more instructions, when executed by one or more processors of a base station, may cause the one or more processors to: configure one or more reference signals associated with a unicast service channel and one or more reference signals associated with an MBS channel; and transmit, to a UE, configuration information for obtaining a set of measurements related to the unicast service channel based at least in part on the one or more reference signals associated with the unicast service channel and a set of measurements related to the MBS channel based at least in part on the one or more reference signals associated with the MB S channel.

In some aspects, an apparatus for wireless communication may include: means for configuring one or more reference signals associated with a unicast service channel and one or more reference signals associated with an MBS channel; and means for transmitting, to a UE, configuration information for obtaining a set of measurements related to the unicast service channel based at least in part on the one or more reference signals associated with the unicast service channel and a set of measurements related to the MBS channel based at least in part on the one or more reference signals associated with the MBS channel.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
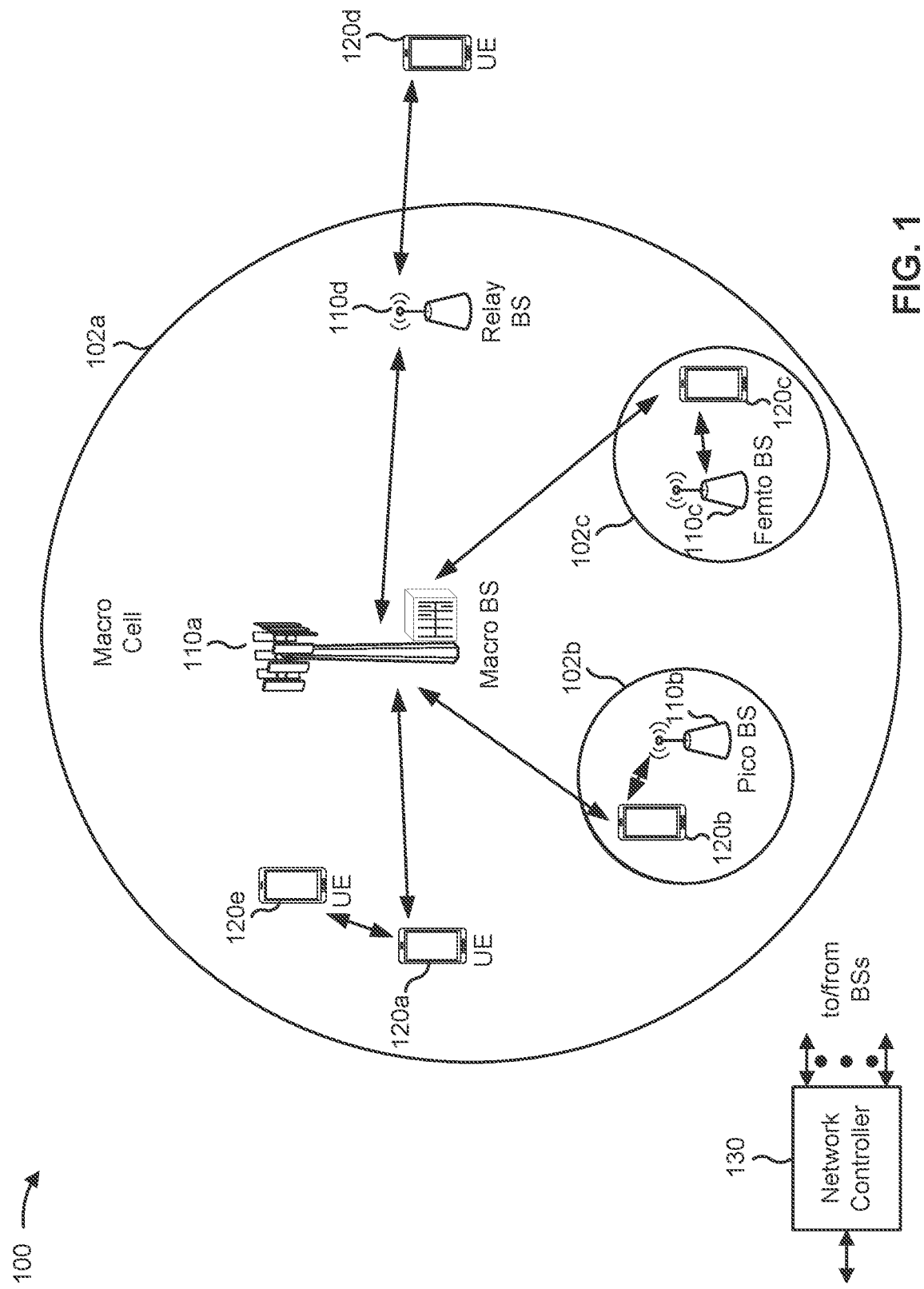
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
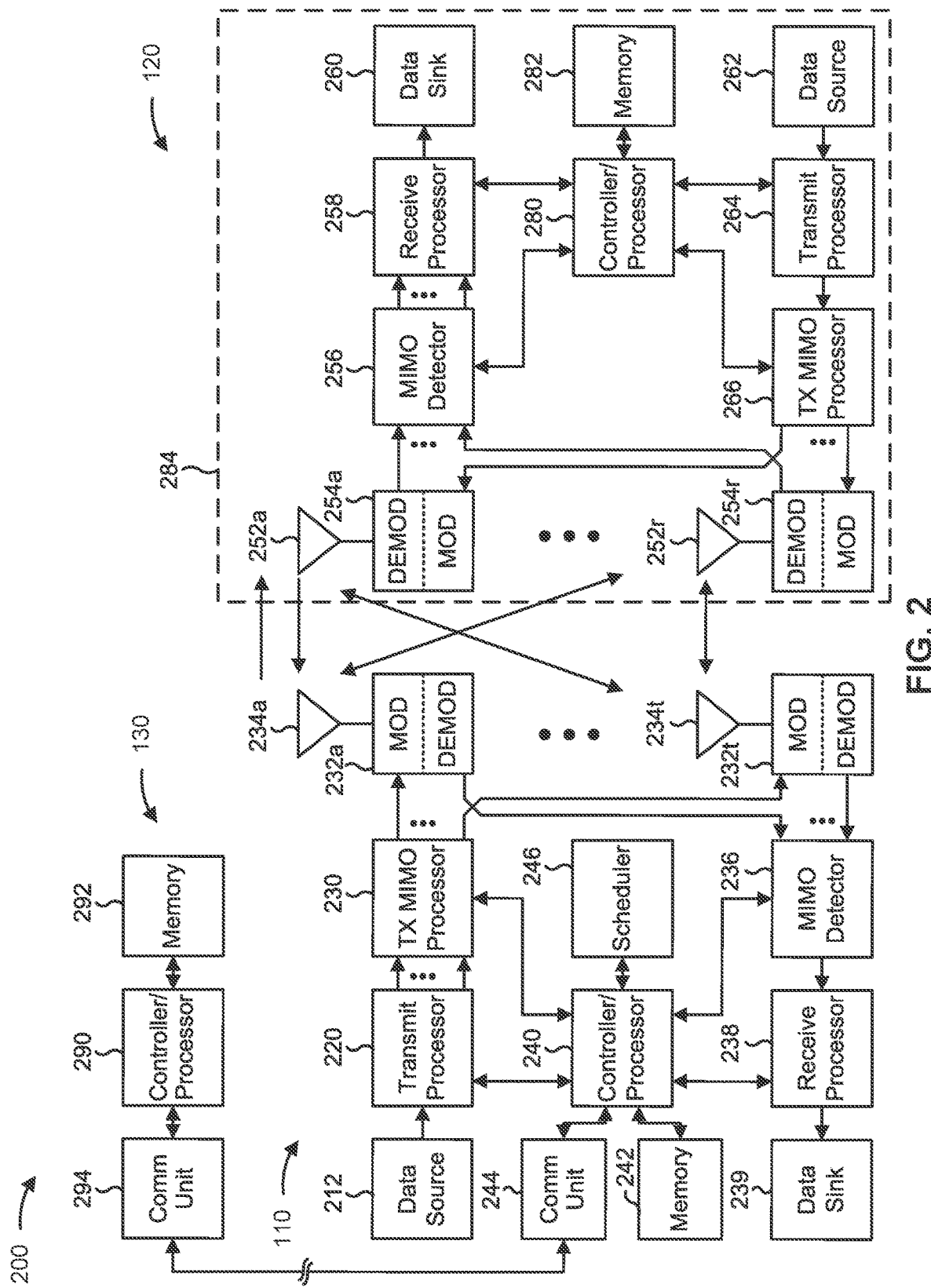
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with measurements for multicast/broadcast service (MBS) continuity, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, interpreting the instructions, and/or the like.

In some aspects, UE 120 may include means for obtaining a set of measurements related to a unicast service channel based at least in part on one or more reference signals associated with the unicast service channel and a set of measurements related to an MBS channel based at least in part on one or more reference signals associated with the MBS channel, means for applying one or more communication parameters to ensure continuity for an MBS service, wherein the one or more communication parameters are based at least in part on the set of measurements related to the unicast service channel and the set of measurements related to the MBS channel, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring one or more reference signals associated with a unicast service channel and one or more reference signals associated with an MBS channel, means for transmitting, to UE 120, configuration information for obtaining a set of measurements related to the unicast service channel based at least in part on the one or more reference signals associated with the unicast service channel and a set of measurements related to the MBS channel based at least in part on the one or more reference signals associated with the MBS channel, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
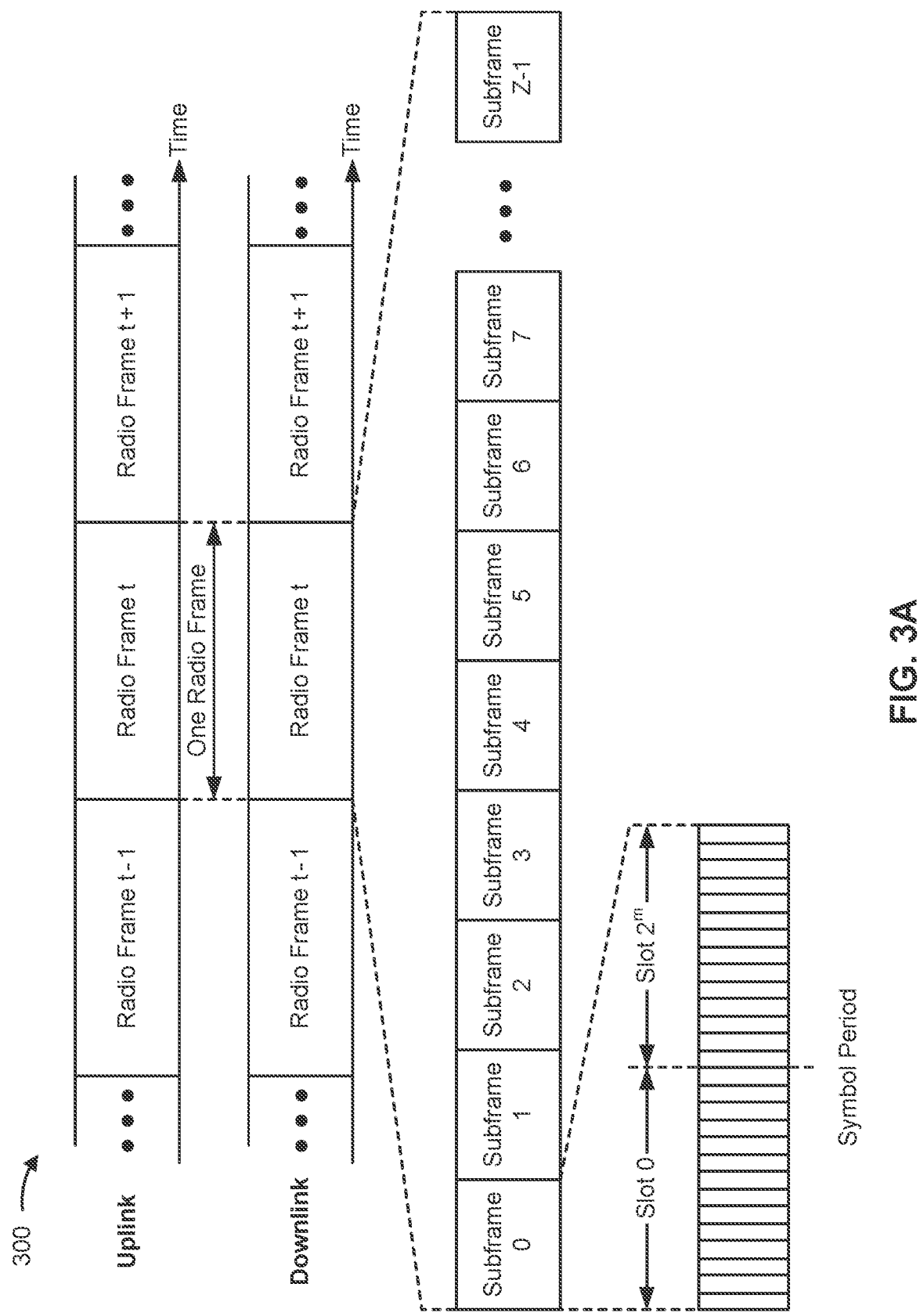
FIG. 3A is a diagram illustrating an example of a frame structure in a wireless network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
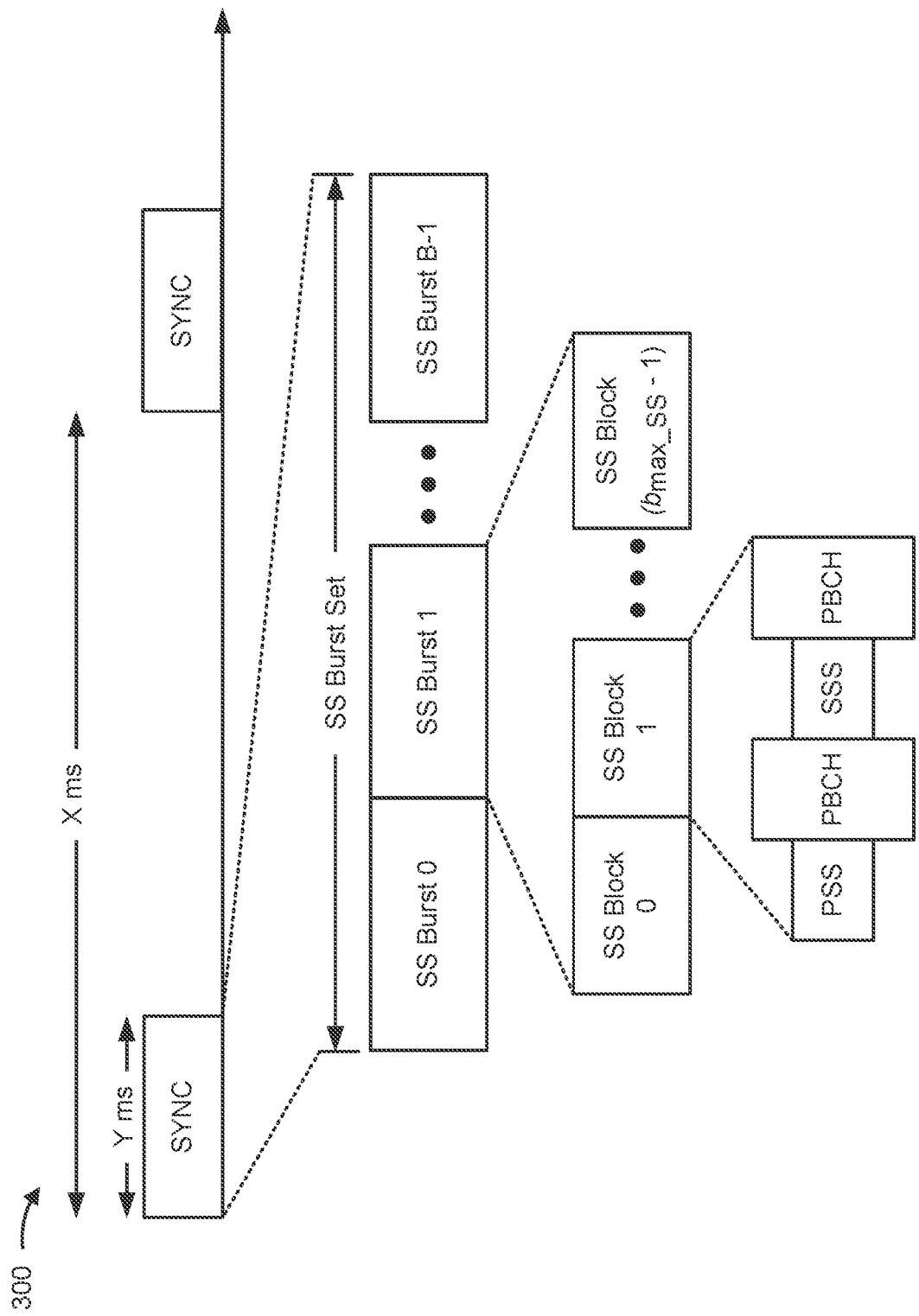
FIG. 3B is a diagram illustrating an example synchronization communication hierarchy in a wireless network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
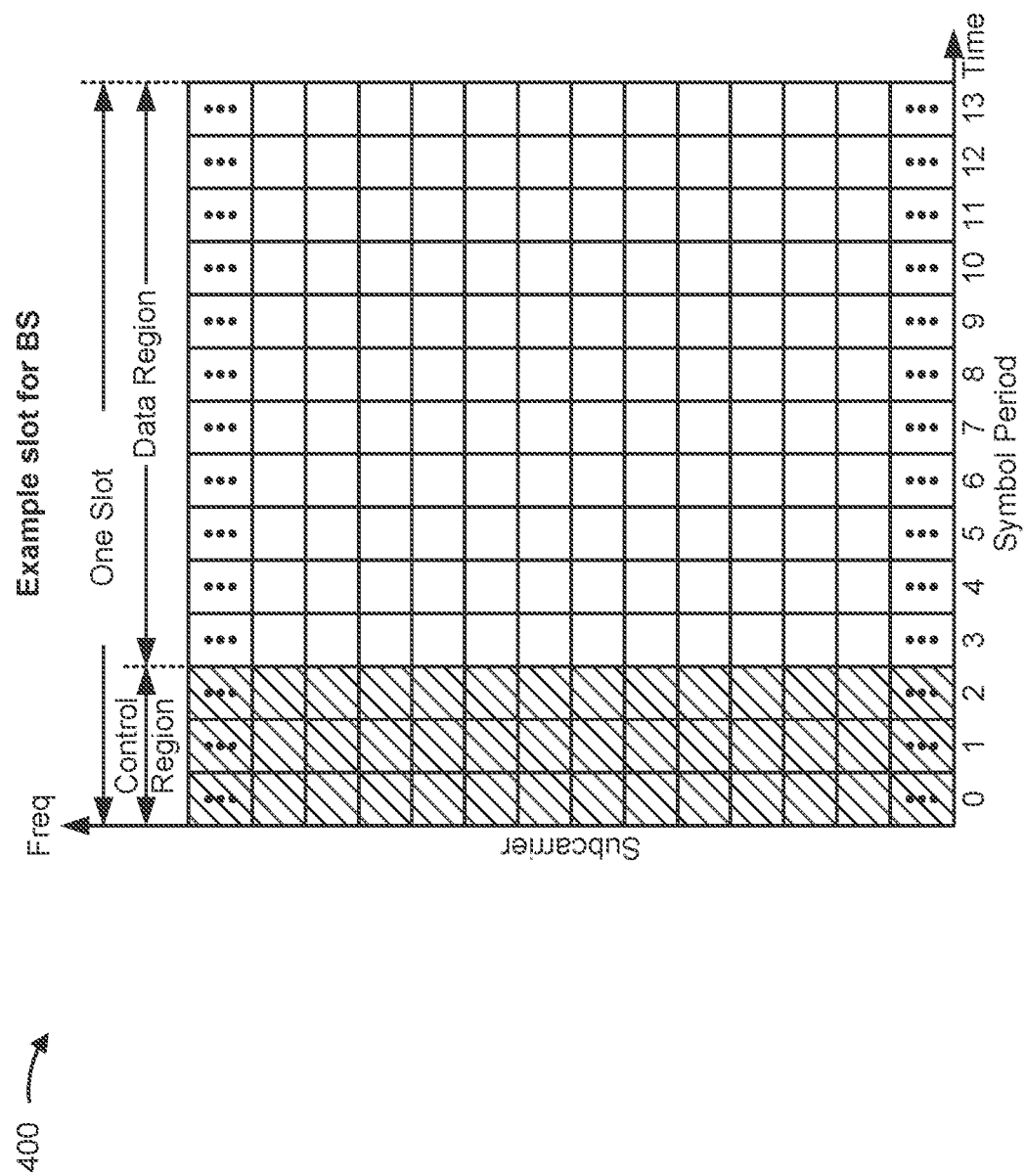
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by one or more metrics or measurements, such as a reference signal received quality (RSRQ), a reference signal received power (RSRP), a received signal strength indicator (RSSI), a signal-to-interference-plus-noise ratio (SINR), and/or the like. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
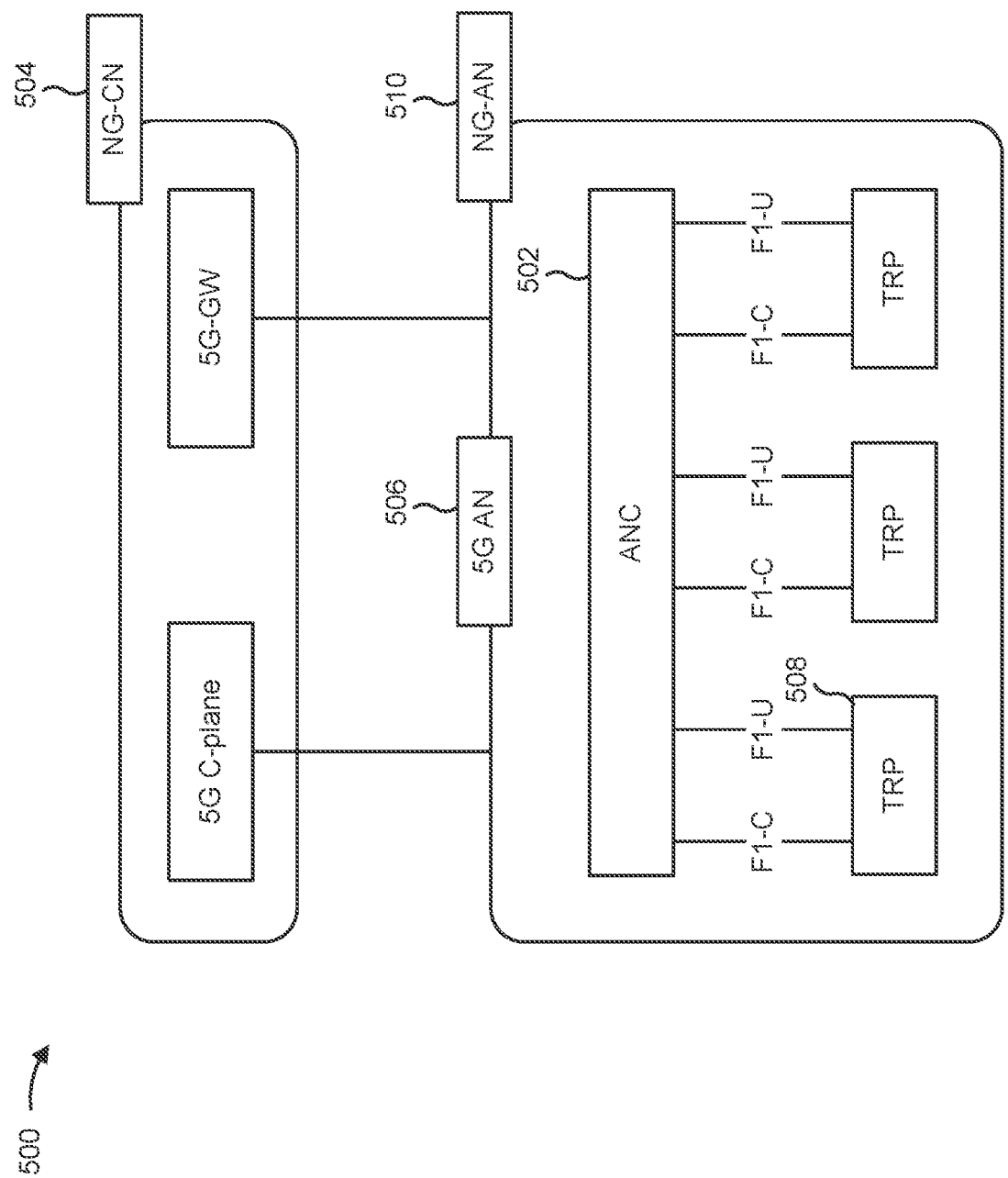
FIG. 5 is a diagram illustrating an example logical architecture of a distributed radio access network (RAN), in accordance with various aspects of the present disclosure.

FIG. 5 is a diagram illustrating an example logical architecture of a distributed RAN 500, according to some aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to some aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to some aspects, no inter-TRP interface may be needed/present.

According to some aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
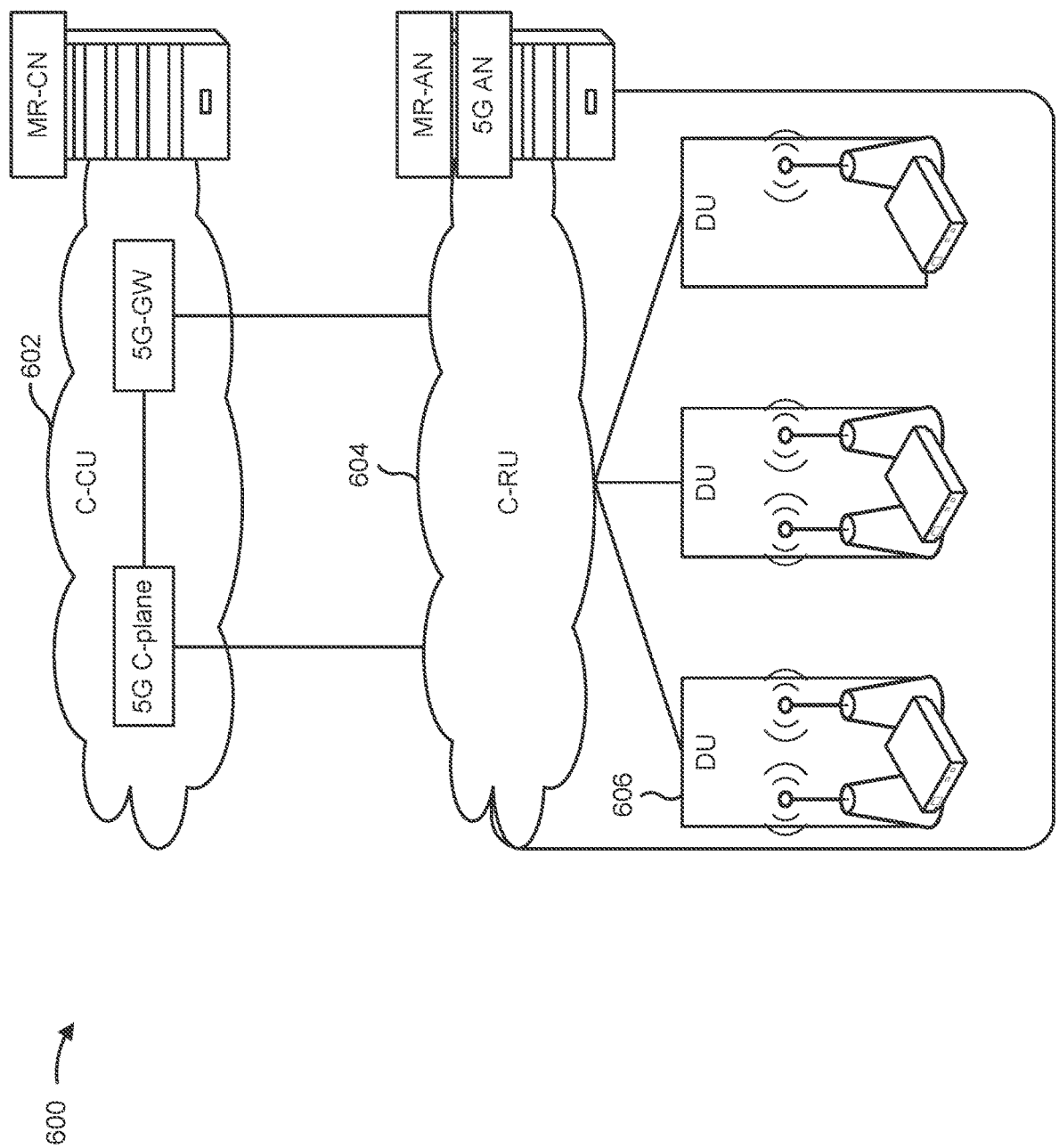
FIG. 6 is a diagram illustrating an example physical architecture of a distributed RAN, in accordance with various aspects of the present disclosure.

FIG. 6 is a diagram illustrating an example physical architecture of a distributed RAN 600, according to various aspects of the present disclosure. A centralized core network unit (C-CU) 602 may host core network functions. The C-CU 602 may be centrally deployed. Functionality of the C-CU 602 may be offloaded (e.g., to advanced wireless services (AWS)) in an effort to handle peak capacity.

A centralized RAN unit (C-RU) 604 may host one or more ANC functions. Optionally, the C-RU 604 may host core network functions locally. The C-RU 604 may have distributed deployment. The C-RU 604 may be closer to the network edge.

A distributed unit (DU) 606 may host one or more TRPs. The DU 606 may be located at edges of the network with radio frequency (RF) functionality.

As indicated above, FIG. 6 is provided as an example. Other examples may differ from what is described with regard to FIG. 6.

In a wireless network, such as an LTE network, an NR network, and/or the like, multicast or broadcast (sometimes referred to herein as multicast/broadcast) services may be supported to simultaneously disseminate data, such as emergency alerts or audio or video content, among many other possibilities, to multiple UEs that may be located in the same or different cells. In general, because multicast/broadcast operations enable multiple UEs to receive the same data at substantially the same time, multicast operations can significantly reduce network overhead relative to unicast operations in which a particular transmission is received by a single UE. In an LTE network, multicast/broadcast operations may be supported using enhanced multimedia broadcast/multicast service (eMBMS), single-cell point-to-multipoint (SC-PTM) services, among other possibilities. For example, in eMBMS, multicast data is transmitted in multiple cells to a group of UEs located in a particular area. In SC-PTM, multicast data is transmitted in a particular cell and the multicast data is received by a group of UEs that are located in the particular cell. In an NR network, a UE may receive multicast/broadcast services (MBS) in a mixed mode or a broadcast mode. For example, in mixed mode, a UE in a radio resource control (RRC) connected mode may receive MBS using a multicast/broadcast radio bearer (MRB) or a dedicated radio bearer (DRB). In broadcast mode, a UE may receive MBS using an MRB in an RRC connected mode, an RRC idle mode, or an RRC inactive mode. Accordingly, one challenge that may arise when implementing MBS in an NR network, a 5G network, and/or the like relates to ensuring MBS service continuity as a UE changes location or transitions between different RRC modes (e.g., from connected to idle, from inactive to connected, and/or the like). However, eMBMS and SC-PTM services only support UE-based service continuity, as the RAN generally does not consider whether the UE is receiving multicast/broadcast services when managing UE mobility.

Some techniques and apparatuses described herein provide a UE with a capability to obtain MBS measurements based at least in part on one or more MBS-specific reference signals in order to inform RAN-based and UE-based service continuity decisions. For example, when a UE is operating in an RRC connected mode in an NR network, a 5G network, and/or the like, MBS continuity may be coordinated by a RAN node, such as a base station, which may determine whether to trigger a handover for the UE, cause the UE to switch between communicating using an MRB and a DRB (or vice versa), and/or the like based at least in part on one or more unicast measurements and one or more MBS measurements. In this way, RAN-based service continuity may provide MBS with better reliability, shorter interruption, and reduced latency relative to approaches that rely solely on UE-based service continuity. Furthermore, when a UE is receiving MBS in an RRC idle or an RRC inactive mode or from a non-serving cell, the UE may manage MBS continuity (e.g., by triggering a cell reselection, switching between communicating using an MRB and a DRB (or vice versa), and/or the like) based at least in part on one or more unicast measurements and one or more MBS measurements. In this way, because MBS coverage may be the same or different from unicast coverage, a UE may experience less MBS disruption, improved performance, and/or the like by making service continuity decisions that consider both unicast and MBS measurements.

Figure 7:
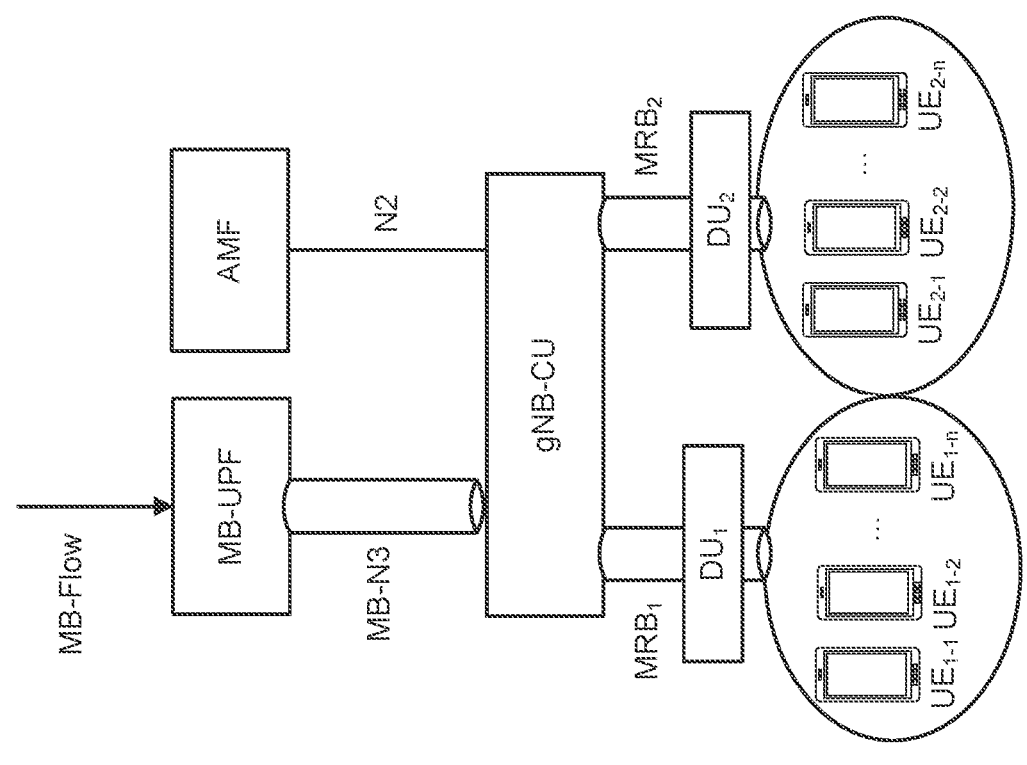
FIG. 7 is a diagram illustrating an example multicast/broadcast service (MBS) architecture, in accordance with various aspects of the present disclosure.

FIG. 7 is a diagram illustrating an example 700 of an MBS architecture, in accordance with various aspects of the present disclosure. As shown in FIG. 7, the MBS architecture may include a multicast/broadcast user plane function (MB-UPF) that receives (e.g., from an application server) a multicast/broadcast (MB) flow including content to be multicasted and/or broadcasted, and the MBS architecture may further include a centralized base station unit (gNB-CU) that receives the MB flow and a temporary mobile group identity (TMGI) associated with the MB flow from the MB-UPF over an MB-N3 tunnel (e.g., a user plane interface for delivering the MB flow and the corresponding TMGI using a general packet radio service tunneling protocol (GTP)). Furthermore, the gNB-CU may communicate with an access and mobility management function (AMF) that manages UE network registration, manages mobility, maintains non-access stratum (NAS) signaling connections, manages UE registration procedures, and/or the like. For example, the gNB-CU may communicate with the AMF over an N2 interface that enables control signaling to establish and/or modify the MB flow and/or the TMGI.

In some aspects, the gNB-CU may map the MB flow received from the MB-UPF to an MRB, a DRB, and/or the like based at least in part on the TMGI associated with the MB flow, and the gNB-CU may forward the MB flow to a distributed unit (DU) that may include one or more TRPs, which may multicast or broadcast the content included in the MB flow to one or more UEs via an MRB. Additionally, or alternatively, the DU may transmit the content included in the MB flow to one or more UEs via a DRB. In this way, the MBS architecture may flexibly switch between transmitting content to UEs via a DRB (or a unicast bearer) and an MRB, and may provide unicast assistance to the MRB at lower layers to improve reliability, reduce service disruption, and/or the like. Furthermore, as described herein, the DU(s) and/or the gNB-CU may determine one or more communication parameters to be applied by the UEs to ensure continuity of a service provided via the MRB(s) based at least in part on unicast and MBS measurements obtained by the UEs (e.g., for UEs that are operating in an RRC connected mode). Additionally, or alternatively, the UEs may determine the communication parameters to be applied to ensure continuity of the service provided via the MRB(s) based at least in part on the unicast and MBS measurements obtained by the UEs. For example, the one or more communication parameters may cause the UE to perform a handover from a serving cell to a neighbor cell while in an RRC connected mode, perform a cell reselection while in an RRC idle or inactive mode, switch from communicating using an MRB to communicating using a DRB, switch from communicating using a DRB to communicating using an MRB, and/or the like.

As indicated above, FIG. 7 is provided as an example. Other examples may differ from what is described with respect to FIG. 7.

Figure 8A:
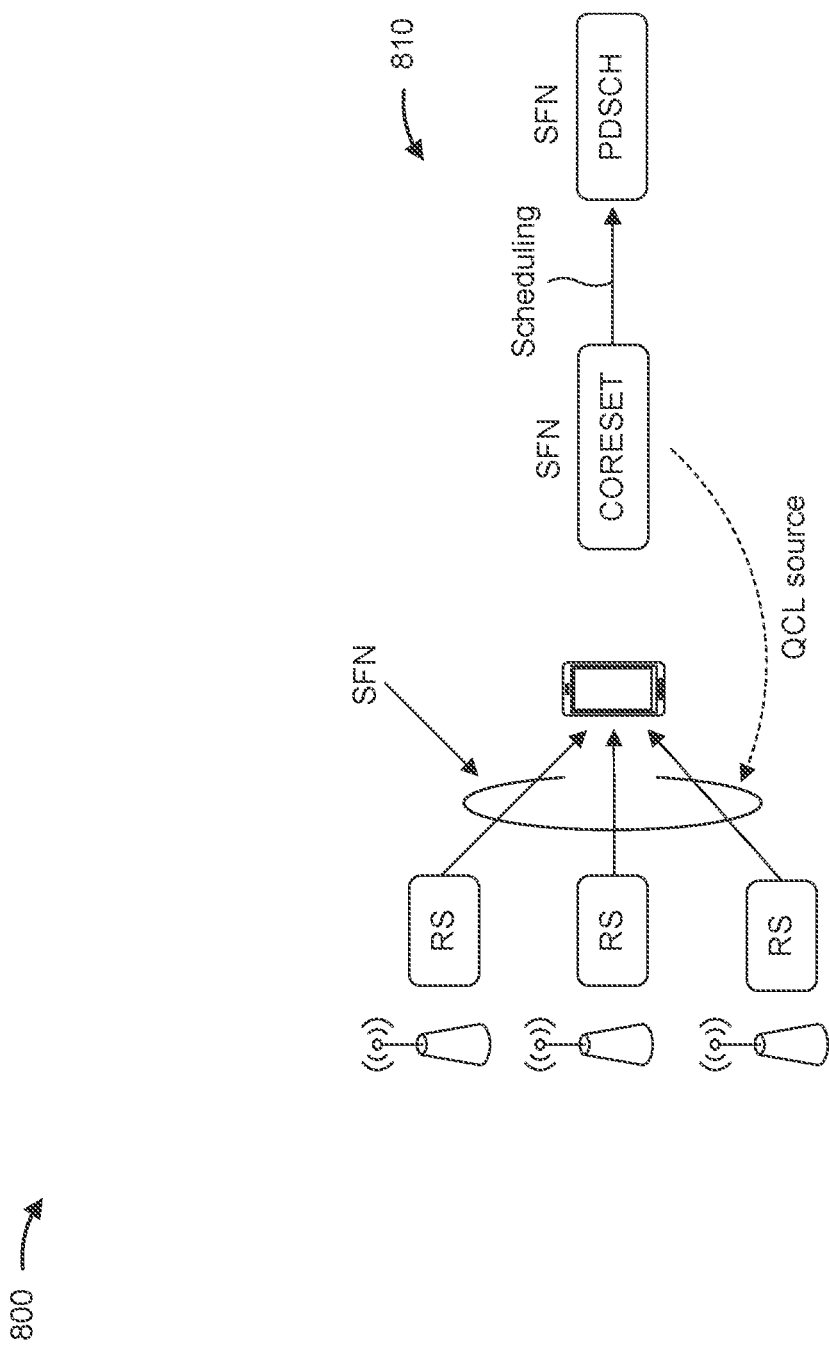
FIGS. 8A-8B are diagrams illustrating examples of a single frequency network (SFN) that may be used to carry an MBS channel, in accordance with various aspects of the present disclosure.
Figure 8B:
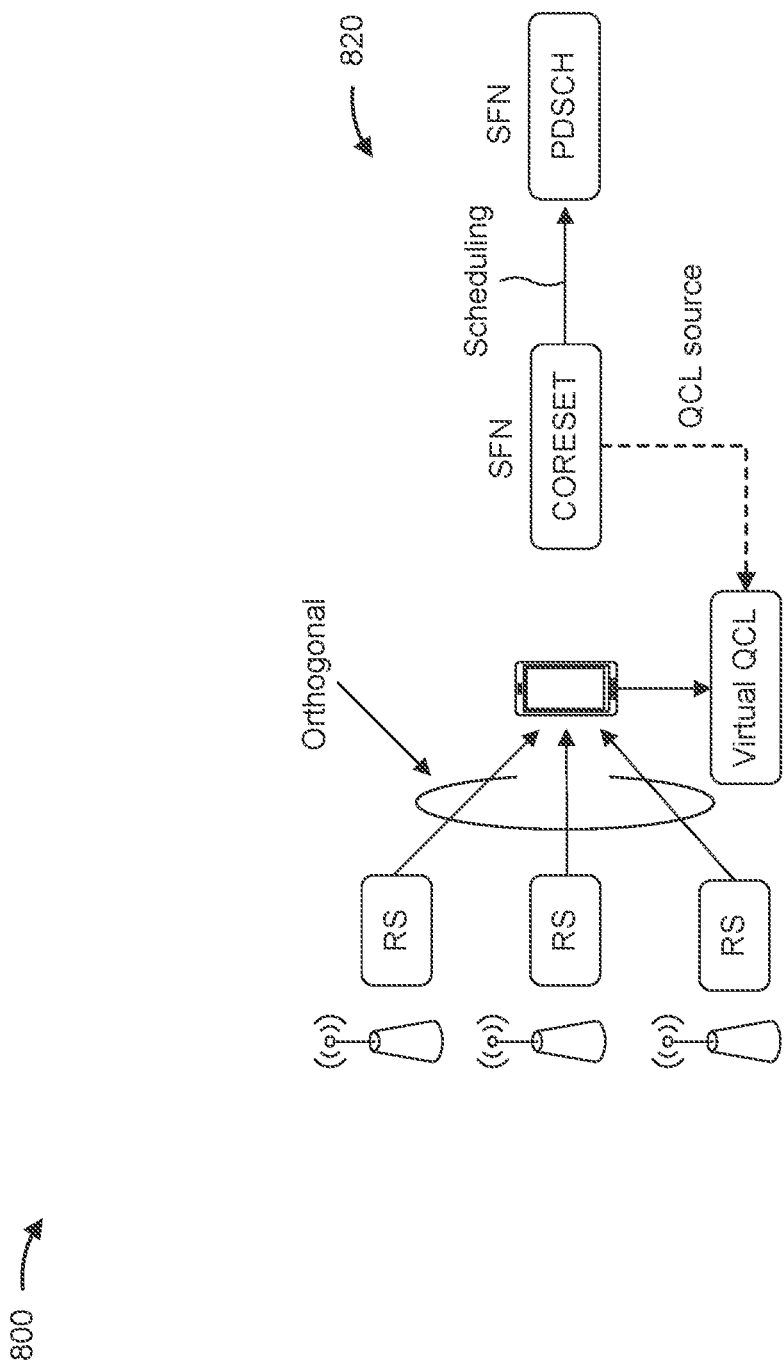

FIGS. 8A-8B are diagrams illustrating examples 800 of a single frequency network (SFN) that may be used to carry an MBS channel, in accordance with various aspects of the present disclosure. For example, in some aspects, the MBS channel may include a physical downlink control channel (PDCCH), a physical downlink shared channel (PDSCH), and/or the like, which may be shared with a unicast channel. In this case, MBS-specific measurements to support continuity for a service provided via the MBS channel may be unnecessary because radio resource management (RRM) measurements for the unicast channel may apply to the MBS channel. However, in some cases, performance may be improved by carrying the MBS channel over an SFN, which generally refers to a network configuration in which multiple transmitters simultaneously transmit the same signal over the same frequency channel. In such cases, as described in further detail below, a UE may obtain MBS-specific measurements in addition to unicast measurements (e.g., RRM measurements) to better inform decision-making to ensure continuity of a service provided via the MBS channel.

For example, as shown in FIG. 8A, and by reference number 810, an example SFN configuration may include an SFN area with multiple transmitters that transmit one or more identical waveforms using the same frequency at the same time. For example, the identical waveform(s) simultaneously transmitted by the multiple transmitters may include a PDSCH, a control resource set (CORESET) scheduling the PDSCH, a reference signal (e.g., a synchronization signal block (SSB), a channel state information reference signal (CSI-RS), a tracking reference signal (TRS)), and/or the like. Accordingly, when the multiple transmitters simultaneously transmit the same reference signal to a UE in the manner shown by reference number 810, the SFN configuration may be transparent to the UE, and the UE may aggregate the simultaneous reference signal transmissions from the multiple cells, which provides higher signal quality, tolerance for multipath attenuation, and/or the like.

Additionally, or alternatively, as shown in FIG. 8B, and by reference number 820, an SFN area may include multiple transmitters that transmit one or more identical waveforms using the same frequency at the same time (e.g., the PDSCH and the CORESET scheduling the PDSCH) and the multiple transmitters may also transmit one or more reference signals that differ with respect to one or more of time, frequency, or code (e.g., the reference signals may be orthogonal). In this case, the UE may generate virtual quasi co-location (QCL) information to receive the reference signals from the multiple transmitters. In this way, by enabling the multiple transmitters to transmit reference signals that differ with respect to time, frequency, code, and/or the like, signal quality, tolerance for multipath attenuation, and/or the like may be further improved (e.g., one or more reference signals may not be subject to channel conditions that may be degrading performance for other reference signals transmitted on a different frequency or in a different spatial direction).

Accordingly, when the MBS channel is carried over an SFN, MBS signal quality may be different (e.g., possibly better or possibly worse) than unicast signal quality because an SFN area includes multiple cells that may have different channel properties. Furthermore, the MBS measurements that are obtained may differ depending on whether the transmitters in an SFN area are configured to transmit reference signals using the same time and frequency resources (e.g., as shown in FIG. 8A) or using one or more different QCL properties (e.g., as shown in FIG. 8B). In some aspects, the UE may therefore be configured to obtain separate measurements for the MBS channel and the unicast channel to enable continuity for an MBS service, as described in further detail herein.

As indicated above, FIGS. 8A-8B are provided as an example. Other examples may differ from what is described with respect to FIGS. 8A-8B.

Figure 9A:
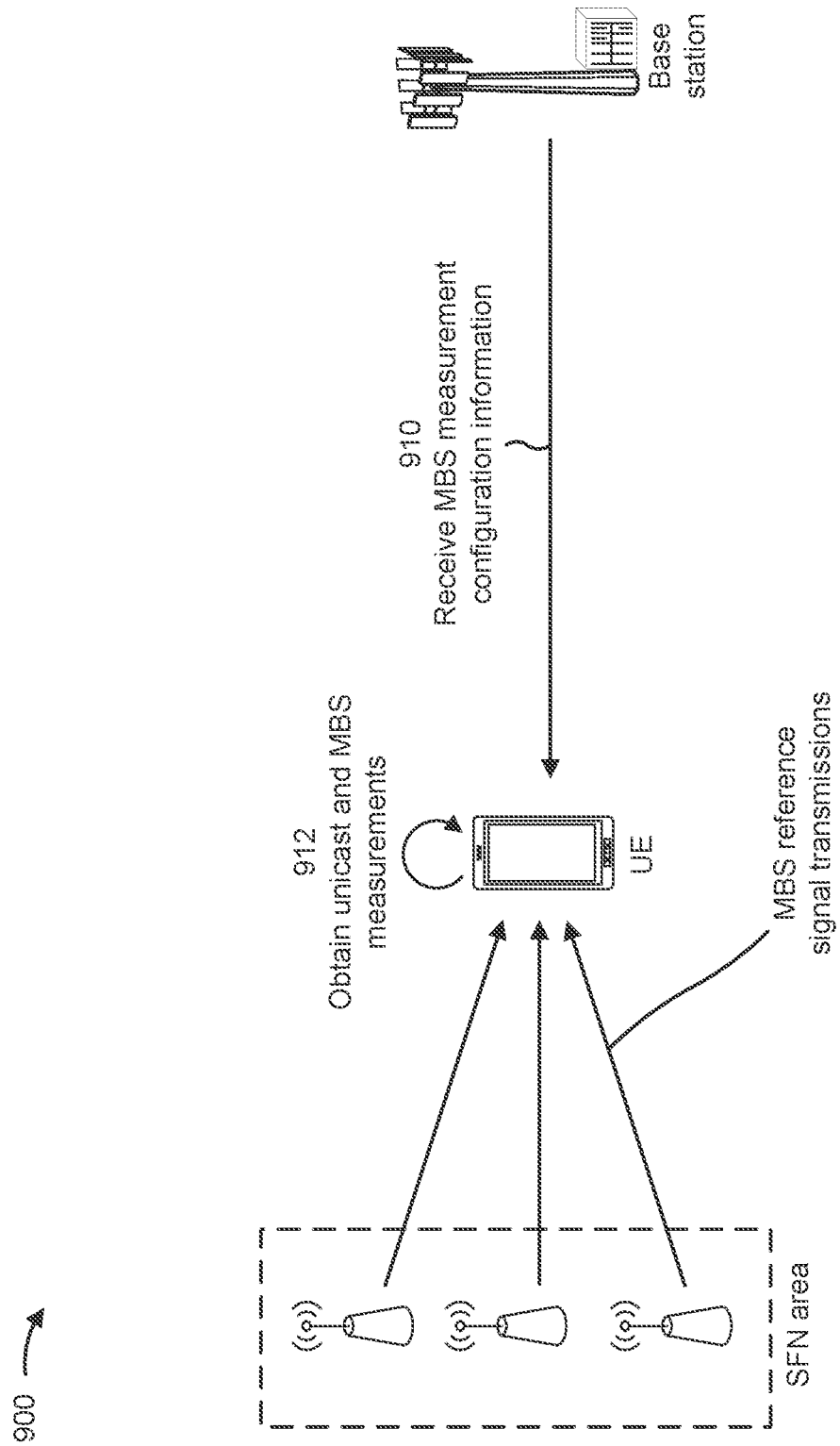
FIGS. 9A-9C are diagrams illustrating examples of measurements for MBS continuity, in accordance with various aspects of the present disclosure.
Figure 9B:
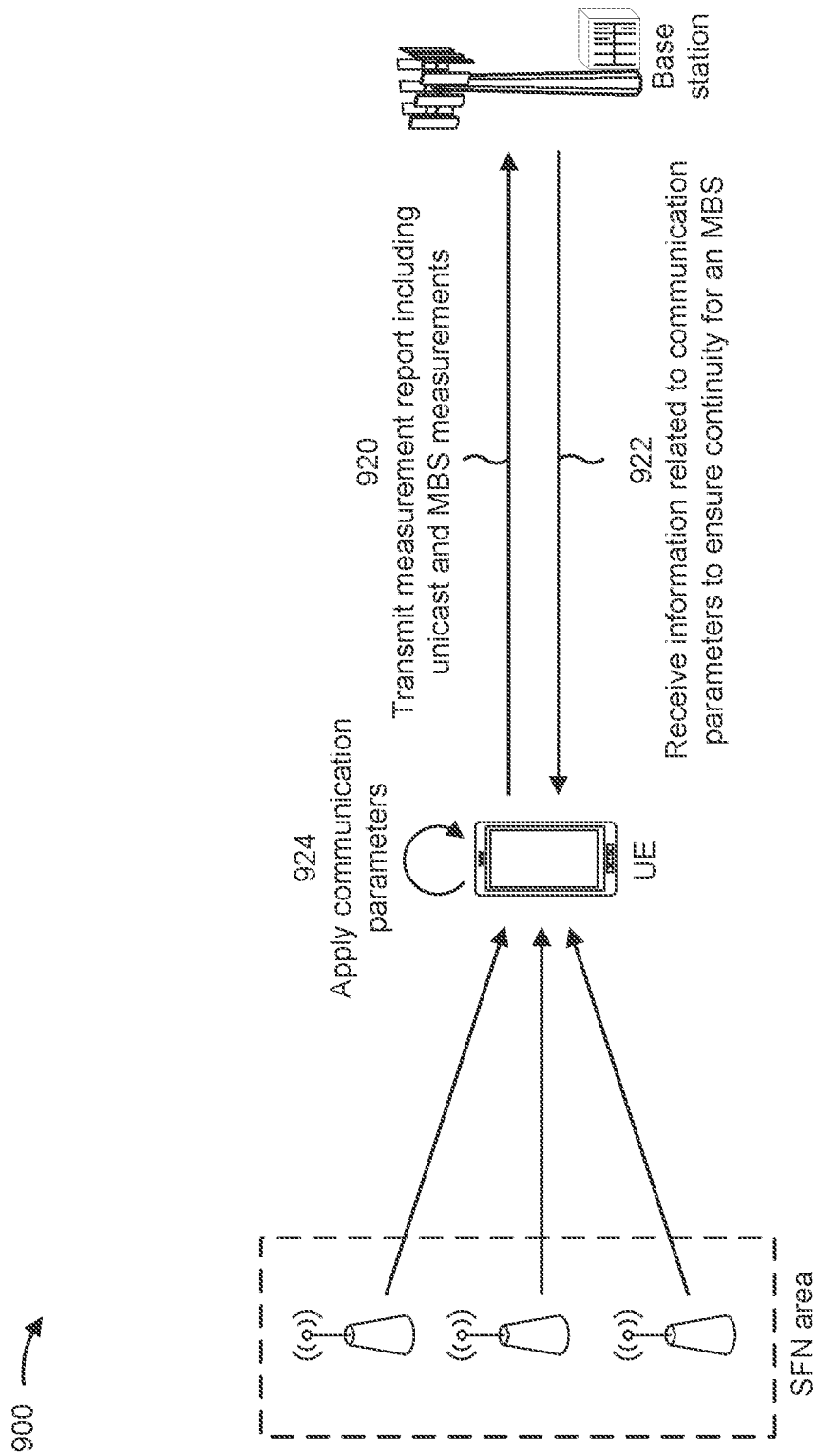
Figure 9C:
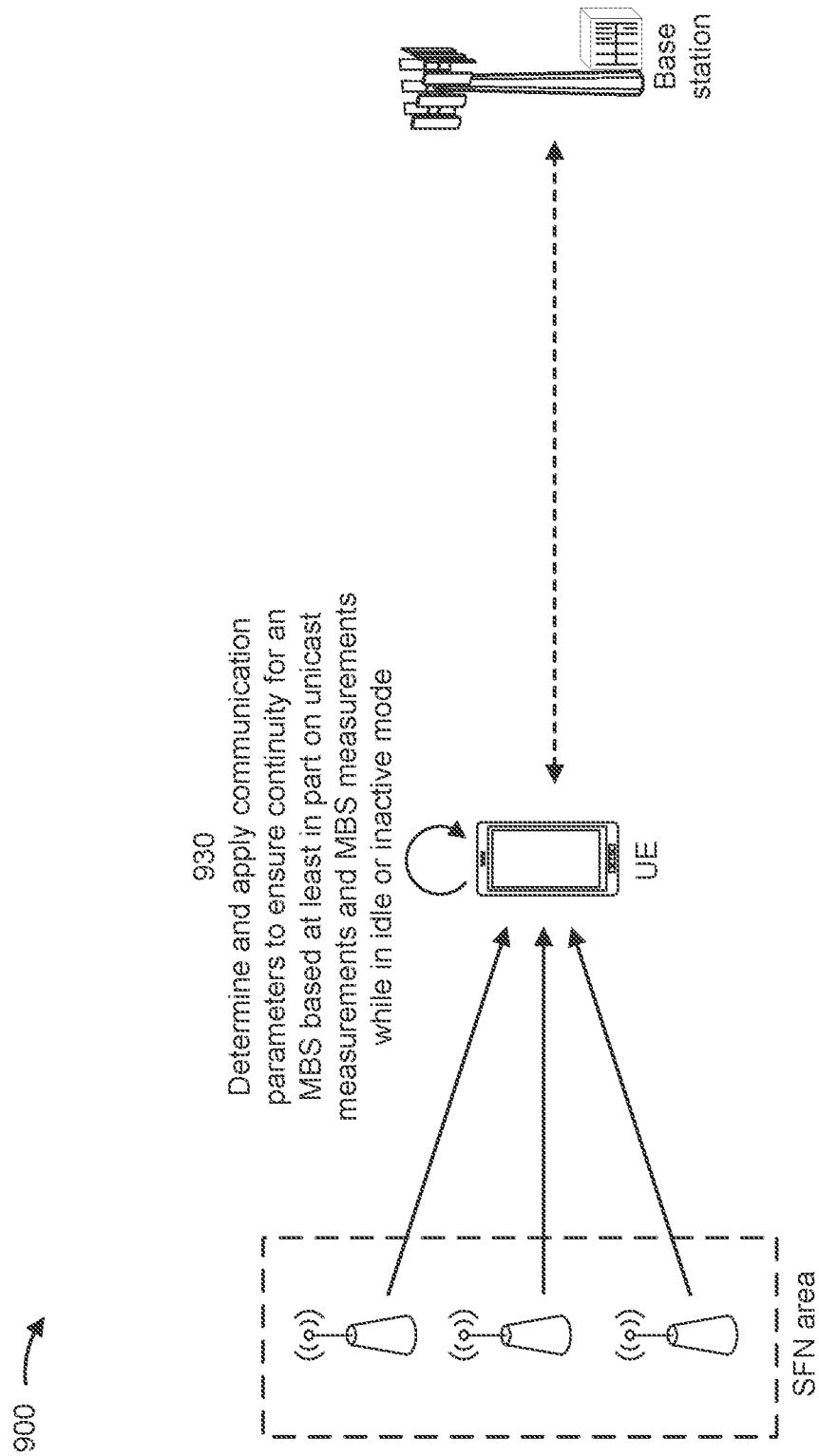

FIGS. 9A-9C are diagrams illustrating examples 900 of measurements for MBS continuity, in accordance with various aspects of the present disclosure. As shown in FIGS. 9A-9C, example 900 includes a UE (e.g., UE 120) receiving MBS from multiple transmitters in one or more SFN areas. For example, in some aspects, the one or more SFN areas may be implemented in a centralized RAN unit, a distributed RAN unit, and/or the like. As further shown in FIGS. 9A-9C, example 900 includes a base station (e.g., BS 110) in communication with the UE to configure MBS measurements to support MBS continuity. For example, in some aspects, the base station may include a centralized RAN unit, one or more distributed RAN units, and/or the like.

As shown in FIG. 9A, and by reference number 910, the base station may transmit, and the UE may receive, MBS measurement configuration information. For example, in some aspects, the base station may transmit the MBS measurement configuration information to the UE over a multicast/broadcast control channel (MBCCH), a unicast signaling radio bearer (SRB), a system information block (SIB), a radio resource control (RRC) message, MRB configuration information, and/or the like. In some aspects, the MBS measurement configuration information may indicate one or more parameters that the UE is to apply to obtain measurements associated with an MBS channel while the UE is in an RRC connected mode, an RRC idle mode, an RRC inactive mode, and/or the like. For example, as described herein, the base station may coordinate MBS continuity for the UE based at least in part on a measurement report from the UE while the UE is in an RRC connected mode, and the UE may coordinate MBS continuity based at least in part on one or more measurements associated with an MBS channel while the UE is in an RRC idle or inactive mode. Accordingly, in some aspects, the measurement configuration information may be transmitted to the UE while the UE is in an RRC connected mode (e.g., via an RRC release message) to indicate one or more parameters that the UE is to apply to obtain measurements associated with the MBS channel when the UE is in an RRC idle or inactive mode.

In some aspects, the measurement configuration information received from the base station may include an MBS-specific measurement object (e.g., MeasObjectMBS) or a radio resource management (RRM) measurement object (e.g., MeasObjectNR) that can be configured for unicast and/or MBS measurements. In the latter case, to avoid conflicts with RRM measurements for a unicast channel, the measurement configuration information may include separate unicast and MBS measurement objects. For example, the measurement configuration information may include a first measurement object for unicast RRM that is based at least in part on a first type of reference signal transmission (e.g., SSBs) and a second measurement object for unicast RRM that is based at least in part on a second type of reference signal transmission (e.g., SSBs, CSI-RS, TRS, and/or the like). In either case, the measurement configuration information may include various parameters to enable the UE to obtain the measurements related to the MBS channel.

For example, in some aspects, the parameters may include an SFN area resource allocation (e.g., a frequency range, a band, a subcarrier spacing (SCS), a time slot and/or symbol range, and/or the like for the MBS channel), an SFN area identifier (e.g., a physical cell identity (PCI), a cell global identity (CGI), and/or the like) used to represent the multiple transmitters in the SFN area as a virtual cell, a configuration associated with one or more MBS-specific reference signals transmitted in one or more SFN areas (e.g., SSBs, CSI-RS, TRS associated with the MBS channel in each SFN area), a filter mechanism to be applied to the MBS measurements (e.g., a function including a set of coefficients to filter a current measured value according to a recent history of measured values), a measurement window defining a time period in which the UE is to obtain the measurements associated with the MBS channel, and/or the like.

Furthermore, in some aspects, the configuration associated with the one or more MBS-specific reference signals may depend on whether the corresponding MBS-specific reference signals are transmitted in the SFN area using the same frequency and time resources, as shown in FIG. 8A, or using different (e.g., orthogonal) resources, as shown in FIG. 8B. In the former case, the configuration information may indicate one MBS-specific reference signal that is simultaneously transmitted by the multiple transmitters in the SFN area, and in the latter case, the configuration information may indicate multiple MBS-specific reference signals that are transmitted by different transmitters in the SFN area. Additionally, in some aspects, the measurement window defining the time period in which the UE is to obtain the measurements associated with the MBS channel may depend on a type of the MBS-specific reference signal(s). For example, when the MBS-specific reference signals include an SSB, the measurement window may include an SSB measurement timing configuration (SMTC) window, which may have a longer duration than an SMTC window configured for unicast measurements. Additionally, or alternatively, when the MBS-specific reference signals include a CSI-RS, the measurement window may be indicated in an information element for a CSI-RS measurement timing configuration (MTC) window.

As further shown in FIG. 9A, and by reference number 912, the UE may obtain a set of measurements related to a unicast service channel based at least in part on one or more reference signals associated with the unicast service channel and may obtain a set of measurements related to an MBS channel based at least in part on one or more reference signals associated with the MBS channel. In general, the measurements related to the unicast service channel may be obtained according to RRM configuration information, and may include an RSRQ, an RSRP, an RSSI, a SINR, and/or the like for one or more reference signals (e.g., SSBs) received by the UE. Furthermore, as shown, the measurements related to the MBS channel may be based at least in part on one or more MBS-specific reference signals transmitted by multiple transmitters in an SFN area. For example, in some aspects, the MBS-specific reference signals may include an SSB, a CSI-RS, a TRS, and/or the like and the measurements related to the MBS channel may include an MBS-RSRQ, an MBS-RSRP, an MBS-RSSI, an MBS-SINR, and/or the like.

As shown in FIG. 9B, and by reference number 920, the UE may transmit, to the base station, a measurement report that includes one or more of the measurements related to the unicast channel and one or more of the measurements related to the MBS channel when the UE is operating in an RRC connected mode. In some aspects, the measurements related to the unicast channel and/or the MBS channel may include an average measurement for the N-best measurements within the measurement window, where N may be a quantity that is configured by the base station (e.g., in the measurement configuration information, information configuring an MRB, and/or the like). Additionally, or alternatively, the UE may report multiple measurement result sets, such as a respective measurement result set for each of multiple SFN areas. In some aspects, the measurement report may be transmitted to the base station periodically (e.g., upon expiration of a periodic interval) or in an event-based manner that is based at least in part on the UE determining that one or more conditions are satisfied. For example, in some aspects, the one or more conditions may be based on only the set of measurements related to the MBS channel. Additionally, or alternatively, the one or more conditions may be based on a comparison between the set of measurements related to the MBS channel and the set of measurements related to the unicast channel.

For example, in some aspects, the UE may transmit the measurement report to the base station if an MBS-specific RSRP, RSRQ, RSSI, SINR, and/or the like satisfies a threshold and/or fails to satisfy a threshold. Additionally, or alternatively, the measurement report may be transmitted to the base station if an MBS-specific measurement from a neighbor cell exceeds an MBS-specific measurement from a serving cell by a threshold amount, the MBS-specific measurement from the neighbor cell satisfies a threshold, and/or the MBS-specific measurement from the serving cell fails to satisfy a first threshold while the MBS-specific measurement from the neighbor cell satisfies a second threshold. Furthermore, with respect to the conditions that are based on a comparison between the set of measurements related to the MBS channel and the set of measurements related to the unicast channel, the UE may transmit the measurement report to the base station if a measurement associated with the MBS channel exceeds a corresponding measurement associated with the unicast channel by a threshold amount or a measurement associated with the unicast channel exceeds a corresponding measurement associated with the MBS channel by a threshold amount, which may be a zero (e.g., null) value or a non-zero offset.

As further shown in FIG. 9B, and by reference number 920, the base station may transmit, and the UE may receive, information related to one or more communication parameters to ensure continuity of an MBS service, which may be provided via the MBS channel, the unicast channel, and/or the like. For example, based at least in part on the measurement report transmitted by the UE, the base station may determine that the UE is to be handed over from a serving cell to a neighbor cell, that the UE is to switch from communicating via an MRB to communicating via a unicast DRB, that the UE is to switch from communicating via a unicast DRB to communicating via an MRB, and/or the like. Additionally, or alternatively, the base station may determine that the UE is to continue communicating with the same serving cell (e.g., via an MRB or a DRB). Accordingly, as further shown in FIG. 9B, and by reference number 924, the UE may apply the communication parameters received from the base station to maintain continuity for the MBS service. For example, the UE may perform a handover to a neighbor cell, switch between communicating via the MRB and communicating via the unicast DRB, continue communicating with the same serving cell via the same radio bearer, and/or the like based at least in part on the communication parameters that are provided by the base station while the UE is in an RRC connected mode.

Additionally, or alternatively, as shown in FIG. 9C, and by reference number 930, the UE may determine and apply one or more communication parameters to ensure continuity of the MBS service based at least in part on the unicast and MBS-specific measurements while the UE is in an RRC idle or inactive mode. For example, in some aspects, the UE may monitor reference signals from multiple SFN areas in parallel, and may average measurements related to the unicast channel and/or the MBS channel based at least in part on the M-best measurements within a measurement window, where M may be a quantity that is configured by the base station (e.g., in the measurement configuration information, information configuring an MRB, an SIB, an RRC release message, and/or the like), which may be the same value or a different value as the value for N used to average measurements when the UE is operating in an RRC connected mode. Accordingly, in some aspects, the UE may determine whether to perform a cell reselection, determine whether to switch from communicating via an MRB to communicating via a unicast DRB, determine whether to switch from communicating via a unicast DRB to communicating via an MRB, and/or the like based on the unicast and MBS-specific measurements to ensure continuity for the MBS while operating in an RRC idle or inactive mode.

As indicated above, FIGS. 9A-9C are provided as an example. Other examples may differ from what is described with respect to FIGS. 9A-9C.

Figure 10:
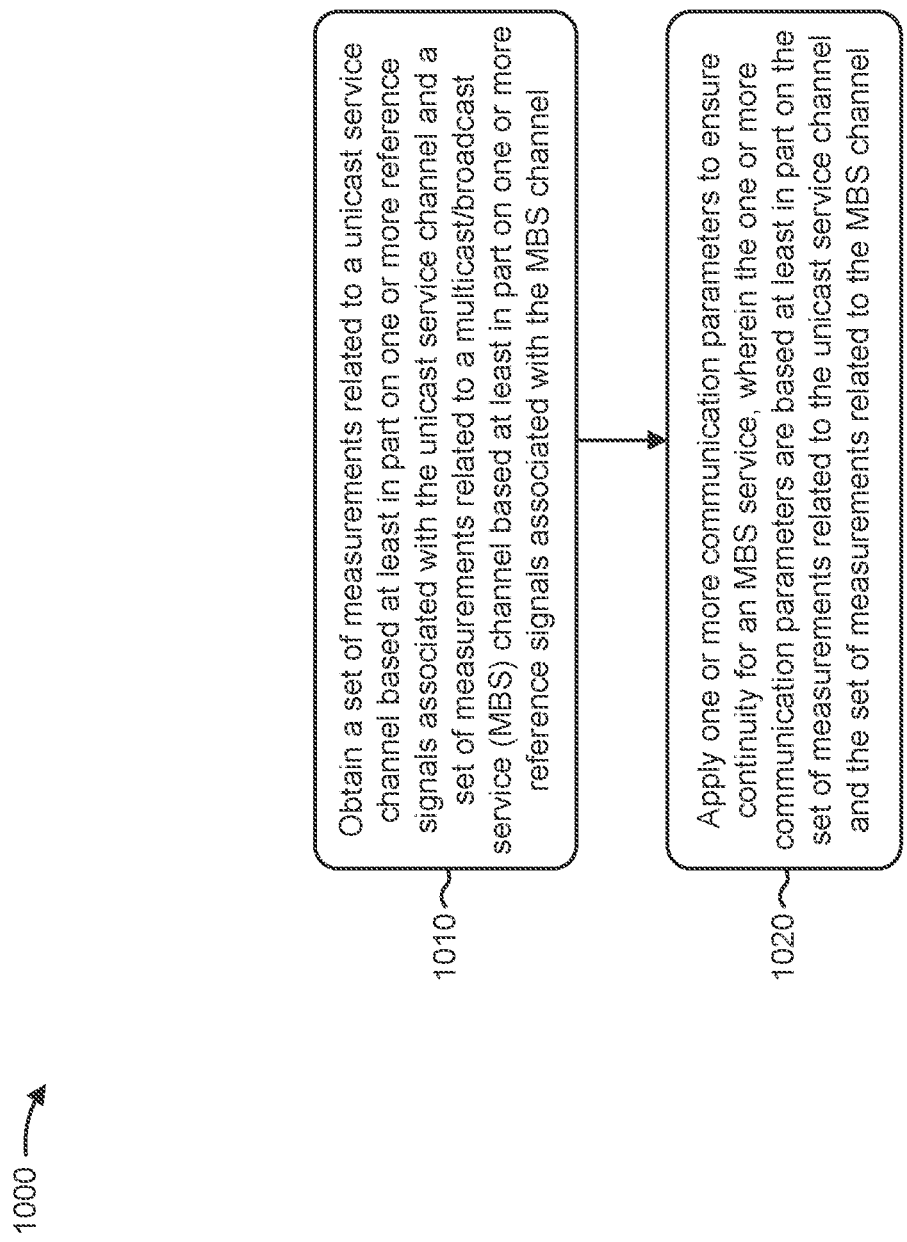
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120 and/or the like) performs operations associated with measurements for MBS continuity.

As shown in FIG. 10, in some aspects, process 1000 may include obtaining a set of measurements related to a unicast service channel based at least in part on one or more reference signals associated with the unicast service channel and a set of measurements related to an MBS channel based at least in part on one or more reference signals associated with the MBS channel (block 1010). For example, the UE may obtain (e.g., using antenna 252, DEMOD 254, MIMO detector 256, receive processor 258, controller/processor 280, and/or the like) a set of measurements related to a unicast service channel based at least in part on one or more reference signals associated with the unicast service channel and a set of measurements related to an MBS channel based at least in part on one or more reference signals associated with the MBS channel, as described above.

As further shown in FIG. 10, in some aspects, process 1000 may include applying one or more communication parameters to ensure continuity for an MBS service, wherein the one or more communication parameters are based at least in part on the set of measurements related to the unicast service channel and the set of measurements related to the MBS channel (block 1020). For example, the UE may apply (e.g., using antenna 252, DEMOD 254, MIMO detector 256, receive processor 258, controller/processor 280, transmit processor 264, TX MIMO processor 266, MOD 254, antenna 252, and/or the like) one or more communication parameters to ensure continuity for an MBS service, as described above. In some aspects, the one or more communication parameters are based at least in part on the set of measurements related to the unicast service channel and the set of measurements related to the MBS channel.

Process 1000 may include additional aspects, such as any single aspect or any combination of aspects described below and/or in connection with one or more other processes described elsewhere herein.

In a first aspect, the set of measurements related to the MBS channel includes an RSRQ, an RSRP, an RSSI, or a SINR, and/or the like.

In a second aspect, alone or in combination with the first aspect, the one or more reference signals associated with the MBS channel are configured for an SFN area.

In a third aspect, alone or in combination with one or more of the first and second aspects, process 1000 includes receiving, from a base station, configuration information for obtaining the set of measurements related to the MBS channel, where the configuration information includes a frequency, a band, or a subcarrier spacing associated with the MBS channel, information related to one or more single frequency network areas that are each identified as a virtual cell that includes one or more transmitters, a configuration associated with the one or more reference signals associated with the MBS channel, a filter to be applied to the set of measurements related to the MBS channel, a time window in which the UE is to obtain the set of measurements related to the MBS channel, and/or the like.

In a fourth aspect, alone or in combination with one or more of the first through third aspects, process 1000 includes receiving, from a base station, first configuration information for obtaining the set of measurements related to the MBS channel and second configuration information for obtaining the set of measurements related to the unicast channel.

In a fifth aspect, alone or in combination with one or more of the first through fourth aspects, process 1000 includes transmitting, to a base station, a measurement report that includes the set of measurements related to the unicast channel and the set of measurements related to the MBS channel, where the measurement report is to be used by the base station to determine the one or more communication parameters to ensure continuity for the MBS service while the UE is in a connected mode.

In a sixth aspect, alone or in combination with one or more of the first through fifth aspects, the measurement report is transmitted to the base station based at least in part on an expiration of a periodic interval.

In a seventh aspect, alone or in combination with one or more of the first through sixth aspects, the measurement report is transmitted to the base station based at least in part on determining that the set of measurements related to the MBS channel satisfies a condition.

In an eighth aspect, alone or in combination with one or more of the first through seventh aspects, the condition is satisfied based at least in part on the set of measurements related to the MBS channel including a measurement, associated with a serving cell, that satisfies a threshold, a measurement associated with the serving cell that fails to satisfy the threshold, a measurement associated with a serving cell and a measurement associated with a neighbor cell having a difference that satisfies a threshold, a measurement associated with the neighbor cell that satisfies a threshold, and/or measurement associated with the serving cell that fails to satisfy a first threshold and a measurement associated with the neighbor cell that satisfies a second threshold.

In a ninth aspect, alone or in combination with one or more of the first through eighth aspects, the measurement report is transmitted to the base station based at least in part on determining that the set of measurements related to the unicast channel and the set of measurements related to the MBS channel satisfy a condition.

In a tenth aspect, alone or in combination with one or more of the first through ninth aspects, the condition is satisfied based at least in part on the set of measurements related to the unicast channel and the set of measurements related to the MBS channel including a measurement associated with the MBS channel that exceeds a corresponding measurement associated with the unicast channel by a threshold amount and/or a measurement associated with the unicast channel that exceeds a corresponding measurement associated with the MBS channel by a threshold amount.

In an eleventh aspect, alone or in combination with one or more of the first through tenth aspects, process 1000 includes receiving, from the base station, information related to the one or more communication parameters to ensure continuity for the MBS service, where applying the one or more communication parameters may include performing a handover from a serving cell to a neighbor cell, switching from communicating via a multicast radio bearer to communicating via a dedicated radio bearer, switching from communicating via the dedicated radio bearer to communicating via the multicast radio bearer, and/or the like.

In a twelfth aspect, alone or in combination with one or more of the first through eleventh aspects, process 1000 includes determining the one or more communication parameters to ensure continuity for the MBS service based at least in part on the set of measurements related to the unicast channel and the set of measurements related to the MBS channel while in an idle mode or an inactive mode.

In a thirteenth aspect, alone or in combination with one or more of the first through twelfth aspects, applying the one or more communication parameters may include performing a cell reselection from a serving cell to a neighbor cell, switching from communicating via a multicast radio bearer to communicating via a dedicated radio bearer, switching from communicating via the dedicated radio bearer to communicating via the multicast radio bearer, and/or the like.

In a fourteenth aspect, alone or in combination with one or more of the first through thirteenth aspects, the set of measurements related to the MBS channel are based at least in part on average values for a quantity of best measurements received during a measurement window.

In a fifteenth aspect, alone or in combination with one or more of the first through fourteenth aspects, the set of measurements related to the MBS channel include a respective measurement result set for each single frequency network area associated with the MBS channel.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a base station, in accordance with various aspects of the present disclosure. Example process 1100 is an example where the base station (e.g., base station 110) performs operations associated with measurements for MBS continuity.

As shown in FIG. 11, in some aspects, process 1100 may include configuring one or more reference signals associated with a unicast service channel and one or more reference signals associated with an MBS channel (block 1110). For example, the base station (e.g., using controller/processor 240, transmit processor 220, TX MIMO processor 230, MOD 232, antenna 234, memory 242, and/or the like) may configure one or more reference signals associated with a unicast service channel and one or more reference signals associated with an MBS channel, as described above.

As further shown in FIG. 11, in some aspects, process 1100 may include transmitting, to a UE, configuration information for obtaining a set of measurements related to the unicast service channel based at least in part on the one or more reference signals associated with the unicast service channel and a set of measurements related to the MBS channel based at least in part on the one or more reference signals associated with the MBS channel (block 1120). For example, the base station (e.g., using controller/processor 240, transmit processor 220, TX MIMO processor 230, MOD 232, antenna 234, memory 242, and/or the like) may transmit, to a UE, configuration information for obtaining a set of measurements related to the unicast service channel based at least in part on the one or more reference signals associated with the unicast service channel and a set of measurements related to the MBS channel based at least in part on the one or more reference signals associated with the MBS channel, as described above.

Process 1100 may include additional aspects, such as any single aspect or any combination of aspects described below and/or in connection with one or more other processes described elsewhere herein.

In a first aspect, the set of measurements related to the MBS channel includes one or more of an RSRQ, an RSRP, an RSSI, or a SINR.

In a second aspect, alone or in combination with the first aspect, the one or more reference signals associated with the MBS channel are configured for an SFN area.

In a third aspect, alone or in combination with one or more of the first and second aspects, the configuration information includes at least one of a frequency, a band, or a subcarrier spacing associated with the MBS channel, information related to one or more single frequency network areas that are each identified as a virtual cell that includes one or more transmitters, a configuration associated with the one or more reference signals associated with the MBS channel, a filter to be applied to the set of measurements related to the MBS channel, or a time window in which the UE is to obtain the set of measurements related to the MBS channel.

In a fourth aspect, alone or in combination with one or more of the first through third aspects, transmitting the configuration information includes transmitting, to the UE, first configuration information for obtaining the set of measurements related to the MBS channel, and transmitting, to the UE, second configuration information for obtaining the set of measurements related to the unicast channel.

In a fifth aspect, alone or in combination with one or more of the first through fourth aspects, process 1100 includes receiving, from the UE, a measurement report that includes the set of measurements related to the unicast channel and the set of measurements related to the MBS channel, and determining, while the UE is in a connected mode, one or more communication parameters to ensure continuity for an MBS service associated with the UE based at least in part on the set of measurements related to the unicast service channel and the set of measurements related to the MBS channel included in the measurement report.

In a sixth aspect, alone or in combination with one or more of the first through fifth aspects, the measurement report is received from the UE based at least in part on an expiration of a periodic interval.

In a seventh aspect, alone or in combination with one or more of the first through sixth aspects, the measurement report is received from the UE based at least in part on the set of measurements related to the MBS channel satisfying a condition.

In an eighth aspect, alone or in combination with one or more of the first through seventh aspects, the condition is satisfied based at least in part on the set of measurements related to the MBS channel including one or more of a measurement, associated with a serving cell, that satisfies a threshold, a measurement associated with the serving cell that fails to satisfy the threshold, a measurement associated with a serving cell and a measurement associated with a neighbor cell having a difference that satisfies a threshold, a measurement associated with the neighbor cell that satisfies a threshold, a measurement associated with the serving cell that fails to satisfy a first threshold and a measurement associated with the neighbor cell that satisfies a second threshold.

In a ninth aspect, alone or in combination with one or more of the first through eighth aspects, the measurement report is received from the UE based at least in part on the set of measurements related to the unicast channel and the set of measurements related to the MBS channel including one or more of a measurement associated with the MBS channel that exceeds a corresponding measurement associated with the unicast channel by a threshold amount, or a measurement associated with the unicast channel that exceeds a corresponding measurement associated with the MBS channel by a threshold amount.

In a tenth aspect, alone or in combination with one or more of the first through ninth aspects, process 1100 includes transmitting, to the UE, information related to the one or more communication parameters to ensure continuity for the MBS service, wherein the information related to the one or more communication parameters causes the UE to perform a handover from a serving cell to a neighbor cell, switch from communicating via a multicast radio bearer to communicating via a dedicated radio bearer, or switch from communicating via the dedicated radio bearer to communicating via the multicast radio bearer.

In an eleventh aspect, alone or in combination with one or more of the first through tenth aspects, process 1100 includes determining, while the UE is in an idle mode or an inactive mode, one or more communication parameters to ensure continuity for an MBS service associated with the UE based at least in part on the set of measurements related to the unicast service channel and the set of measurements related to the MBS channel.

In a twelfth aspect, alone or in combination with one or more of the first through eleventh aspects, process 1100 includes transmitting, to the UE, information related to the one or more communication parameters to ensure continuity for the MBS service, wherein the information related to the one or more communication parameters causes the UE to perform a cell reselection from a serving cell to a neighbor cell, switch from communicating via a multicast radio bearer to communicating via a dedicated radio bearer, or switch from communicating via the dedicated radio bearer to communicating via the multicast radio bearer.

In a thirteenth aspect, alone or in combination with one or more of the first through twelfth aspects, the set of measurements related to the MBS channel are based at least in part on average values for a quantity of best measurements during a measurement window or include a respective measurement result set for each SFN area associated with the MBS channel.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network node, configuration information for obtaining a set of measurements related to a multicast/broadcast service (MBS) channel, wherein the configuration information includes information related to one or more single frequency network areas that are each identified as a virtual cell that includes one or more transmitters;
   obtaining a set of measurements related to a unicast service channel, based at least in part on one or more reference signals associated with the unicast service channel, and the set of measurements related to the MBS channel based at least in part on the configuration information and one or more reference signals associated with the MBS channel; and
   applying one or more communication parameters to ensure continuity for an MBS service, wherein the one or more communication parameters are based at least in part on the set of measurements related to the unicast service channel and the set of measurements related to the MBS channel.

2. The method of claim 1, wherein the set of measurements related to the MBS channel includes one or more of a reference signal received quality, a reference signal received power, a received signal strength indicator, or a signal-to-interference-plus-noise ratio.

3. The method of claim 1, wherein the one or more reference signals associated with the NBS channel are configured for a single frequency network area.

4. The method of claim 1, wherein the configuration information further includes at least one of:
   a frequency, a band, or a subcarrier spacing associated with the NBS channel,
   a configuration associated with the one or more reference signals associated with the MBS channel,
   a filter to be applied to the set of measurements related to the NBS channel, or
   a time window in which the UE is to obtain the set of measurements related to the MBS channel.

5. The method of claim 1, further comprising:
   receiving, from the network node, second configuration information for obtaining the set of measurements related to the unicast channel.

6. The method of claim 1, further comprising:
   transmitting, to a network node, a measurement report that includes the set of measurements related to the unicast channel and the set of measurements related to the MBS channel, wherein the measurement report is to be used by the network node to determine the one or more communication parameters to ensure continuity for the MBS service while the UE is in a connected mode.

7. The method of claim 6, wherein the measurement report is transmitted to the network node based at least in part on an expiration of a periodic interval.

8. The method of claim 6, wherein the measurement report is transmitted to the network node based at least in part on determining that the set of measurements related to the MBS channel satisfies a condition.

9. The method of claim 8, wherein the condition is satisfied based at least in part on the set of measurements related to the MBS channel including one or more of:
   a measurement associated with a serving cell that satisfies a first threshold,
   a measurement associated with the serving cell that fails to satisfy the first threshold,
   a measurement associated with the serving cell and a measurement associated with a neighbor cell having a difference that satisfies the first threshold,
   a measurement associated with the neighbor cell that satisfies the first threshold, a measurement associated with the serving cell that fails to satisfy the first threshold and a measurement associated with the neighbor cell that satisfies a second threshold.

10. The method of claim 6, wherein the measurement report is transmitted to the network node based at least in part on determining that the set of measurements related to the unicast channel and the set of measurements related to the MBS channel include one or more of:
a measurement associated with the MBS channel that exceeds a corresponding measurement associated with the unicast channel by a threshold amount, or
a measurement associated with the unicast channel that exceeds a corresponding measurement associated with the MBS channel by a threshold amount.

11. The method of claim 6, further comprising:
receiving, from the network node, information related to the one or more communication parameters to ensure continuity for the MBS service, wherein applying the one or more communication parameters includes:
performing a handover from a serving cell to a neighbor cell,
switching from communicating via a multicast radio bearer to communicating via a dedicated radio bearer, or
switching from communicating via the dedicated radio bearer to communicating via the multicast radio bearer.

12. The method of claim 1, further comprising:
determining the one or more communication parameters to ensure continuity for the MBS service based at least in part on the set of measurements related to the unicast channel and the set of measurements related to the MBS channel while in an idle mode or an inactive mode.

13. The method of claim 12, wherein applying the one or more communication parameters includes:
performing a cell reselection from a serving cell to a neighbor cell,
switching from communicating via a multicast radio bearer to communicating via a dedicated radio bearer, or
switching from communicating via the dedicated radio bearer to communicating via the multicast radio bearer.

14. The method of claim 1, wherein the set of measurements related to the MBS channel are based at least in part on average values for a quantity of best measurements, wherein the quantity of best measurements are received during a measurement window or include a respective measurement result set for each single frequency network (SFN) area of multiple SFCN areas associated with the MBS channel.

15. A user equipment (UE) for wireless communication, comprising:
a memory; and
one or more processors coupled to the memory, the one or more processors configured to:
receive, from a network node, configuration information for obtaining a set of measurements related to a multicast/broadcast service (MBS) channel, wherein the configuration information includes information related to one or more single frequency network areas that are each identified as a virtual cell that includes one or more transmitters;
obtain a set of measurements related to a unicast service channel, based at least in part on one or more reference signals associated with the unicast service channel, and the set of measurements related to the MBS channel based at least in part on the configuration information and one or more reference signals associated with the MBS channel; and
apply one or more communication parameters to ensure continuity for an MBS service, wherein the one or more communication parameters are based at least in part on the set of measurements related to the unicast service channel and the set of measurements related to the MBS channel.

16. A method of wireless communication performed by a network node, comprising:
configuring one or more reference signals associated with a unicast service channel and one or more reference signals associated with a multicast/broadcast service (MBS) channel; and
transmitting, to a user equipment (UE), configuration information for obtaining:
a set of measurements related to the unicast service channel based at least in part on the one or more reference signals associated with the unicast service channel, and
a set of measurements related to the NBS channel based at least in part on the one or more reference signals associated with the MBS channel,
wherein the configuration information includes information related to one or more single frequency network areas that are each identified as a virtual cell that includes one or more transmitters.

17. The method of claim 16, wherein the set of measurements related to the MBS channel includes one or more of a reference signal received quality, a reference signal received power, a received signal strength indicator, or a signal-to-interference-plus-noise ratio.

18. The method of claim 16, wherein the one or more reference signals associated with the NBS channel are configured for a single frequency network area.

19. The method of claim 16, wherein the configuration information further includes at least one of:
a frequency, a band, or a subcarrier spacing associated with the NBS channel,
a configuration associated with the one or more reference signals associated with the MBS channel,
a filter to be applied to the set of measurements related to the MBS channel, or
a time window in which the UE is to obtain the set of measurements related to the MBS channel.

20. The method of claim 16, wherein transmitting the configuration information includes:
transmitting, to the UE, first configuration information for obtaining the set of measurements related to the MBS channel; and
transmitting, to the UE, second configuration information for obtaining the set of measurements related to the unicast channel.

21. The method of claim 16, further comprising:
receiving, from the UE, a measurement report that includes the set of measurements related to the unicast channel and the set of measurements related to the MBS channel; and
determining, while the UE is in a connected mode, one or more communication parameters to ensure continuity for an MBS service associated with the UE based at least in part on the set of measurements related to the unicast service channel and the set of measurements related to the MBS channel included in the measurement report.

22. The method of claim 21, wherein the measurement report is received from the UE based at least in part on an expiration of a periodic interval.

23. The method of claim 21, wherein the measurement report is received from the UE based at least in part on the set of measurements related to the MBS channel satisfying a condition.

24. The method of claim 23, wherein the condition is satisfied based at least in part on the set of measurements related to the MBS channel including one or more of:
 a measurement, associated with a serving cell, that satisfies a threshold,
 a measurement associated with the serving cell that fails to satisfy the threshold,
 a measurement associated with a serving cell and a measurement associated with a neighbor cell having a difference that satisfies a threshold,
 a measurement associated with the neighbor cell that satisfies a threshold,
 a measurement associated with the serving cell that fails to satisfy a first threshold and a measurement associated with the neighbor cell that satisfies a second threshold.

25. The method of claim 21, wherein the measurement report is received from the UE based at least in part on the set of measurements related to the unicast channel and the set of measurements related to the MBS channel including one or more of:
 a measurement associated with the MBS channel that exceeds a corresponding measurement associated with the unicast channel by a threshold amount, or
 a measurement associated with the unicast channel that exceeds a corresponding measurement associated with the MBS channel by a threshold amount.

26. The method of claim 21, further comprising:
 transmitting, to the UE, information related to the one or more communication parameters to ensure continuity for the MBS service, wherein the information related to the one or more communication parameters causes the UE to:
  perform a handover from a serving cell to a neighbor cell,
  switch from communicating via a multicast radio bearer to communicating via a dedicated radio bearer, or
  switch from communicating via the dedicated radio bearer to communicating via the multicast radio bearer.

27. The method of claim 16, further comprising:
 determining, while the UE is in an idle mode or an inactive mode, one or more communication parameters to ensure continuity for an MBS service associated with the UE based at least in part on the set of measurements related to the unicast service channel and the set of measurements related to the MBS channel.

28. The method of claim 27, further comprising:
 transmitting, to the UE, information related to the one or more communication parameters to ensure continuity for the MBS service, wherein the information related to the one or more communication parameters causes the UE to:
  perform a cell reselection from a serving cell to a neighbor cell,
  switch from communicating via a multicast radio bearer to communicating via a dedicated radio bearer, or
  switch from communicating via the dedicated radio bearer to communicating via the multicast radio bearer.

29. The method of claim 16, wherein the set of measurements related to the MBS channel are based at least in part on average values for a quantity of best measurements during a measurement window or include a respective measurement result set for each single frequency network area associated with the MBS channel.

30. A network node for wireless communication, comprising:
 a memory; and
 one or more processors coupled to the memory, the one or more processors configured to:
  configure one or more reference signals associated with a unicast service channel and one or more reference signals associated with a multicast/broadcast service (MBS) channel; and
  transmit, to a user equipment (UE), configuration information for obtaining:
   a set of measurements related to the unicast service channel based at least in part on the one or more reference signals associated with the unicast service channel, and
   a set of measurements related to the MBS channel based at least in part on the one or more reference signals associated with the MBS channel,
  wherein the configuration information includes information related to one or more single frequency network areas that are each identified as a virtual cell that includes one or more transmitters.

* * * * *